United States Patent
O'Hara et al.

[15] 3,671,462
[45] June 20, 1972

[54] DISPROPORTIONATION CATALYST

[72] Inventors: Joan Irenee O'Hara, Stockton-on-Tees; Christopher Patrick Cadman Bradshaw, Hampton, both of England

[73] Assignee: The British Petroleum Company Limited, London, England

[22] Filed: Oct. 15, 1969

[21] Appl. No.: 866,755

[30] Foreign Application Priority Data

Nov. 6, 1968 Great Britain.................52,545/68

[52] U.S. Cl.....................252/429 A, 252/429 B, 260/683 D
[51] Int. Cl...........................................................C07c 3/62
[58] Field of Search.................252/429 A, 429 B; 260/683 D

[56] References Cited

UNITED STATES PATENTS

| | | | |
|---|---|---|---|
| 2,981,725 | 4/1961 | Luft et al. | 252/429 B X |
| 2,996,459 | 8/1961 | Andersen et al. | 252/429 B |
| 3,008,943 | 11/1961 | Guyer | 252/429 B X |
| 3,150,122 | 9/1964 | Andersen et al. | 252/429 B X |
| 3,152,088 | 10/1964 | Sandri et al. | 252/429 B |
| 3,166,542 | 1/1965 | Orzechowski et al. | 252/429 A X |
| 3,400,110 | 9/1968 | Dassesse et al. | 252/429 C X |
| 3,449,310 | 6/1969 | Dall'Asta et al. | 252/429 B X |
| 3,492,245 | 1/1970 | Calderon et al. | 252/429 B |
| 3,498,961 | 3/1970 | Tazuma | 252/429 A X |
| 3,535,401 | 10/1970 | Calderon et al. | 252/429 B X |

*Primary Examiner*—Patrick P. Garvin
*Attorney*—Morgan, Finnegan, Durham & Pine

[57] ABSTRACT

A heterogeneous disproportionation catalyst is provided which consists essentially of (a) a salt of molybdenum or tungsten (b) tetrabutyl tin and (c) a solid support selected from the group consisting of alumina, silica, magnesia, sepiolite, boria, thoria, charcoal, pumice and molecular sieve and wherein the molar ratio of the tungsten or molybdenum salt to tetrabutyl tin is in the range of from about 5:1 to 0.01:1 and the support is present in an amount of from about 10 to 99.9 percent by weight expressed as a percentage by weight of the total weight of the salt, tetrabutyl tin and support.

5 Claims, No Drawings

DISPROPORTIONATION CATALYST

This invention relates to a novel catalyst system and to a disproportionation process and a process for the coreaction of olefins using the new catalyst system.

A disproportionation reaction is one in which an olefin is converted to products having higher and lower carbon numbers than the feedstock.

British Pat. No. 1125529 discloses a homogeneous catalyst system for the disproportionation of olefins comprising (i) an organometallic compound of an element of Groups IA, IIA, IIB or IIIA of the Periodic Table (ii) a salt of molybdenum or tungsten and (iii) a compound of defined formulas containing oxygen or sulphur. The Periodic Table referred to in 1125529 is that found in the Handbook of Chemistry and Physics, 44th Edition, April 1962 reprint, published by the Chemical Rubber Publication Company, Cleveland, Ohio, U.S.A., page 448. Group IIIA of this version of the Periodic Table corresponds to Group IIIB of the Periodic Table according to Mendeleef.

Our copending application Br. Pat. No. 1,208,068 discloses a homogeneous disproportionation catalyst system comprising (i) a salt of molybdenum or tungsten and (ii) an organometallic compound of a metal of Group IVB of the Periodic Table according to Mendeleef.

Thus according to the present invention there is provided a heterogeneous disproportionation catalyst comprising (i) a salt of molybdenum or tunsten, (ii) an organometallic compound of a metal of Group IVB of the Periodic Table according to Mendeleef and (iii) a solid support.

The preferred salts are tunsten hexachloride and molybdenum pentachloride.

Suitable organometallic compounds include those of metals in Group IVB which have at least one metal to carbon bond. The preferred organometallic compounds are those of tin. The most preferred compound is and tin tetra-n-butyl.

Suitable supports include alumina, silica, silica-alumina, magnesia, sepiolite, boria, thoria, charcoal, pumice, molecular sieves, refractory oxides and salts, e.g. phosphates, silicates, aluminates sulphates, etc. Alumina and silica are preferred.

The molar ratio of tungsten or molybdenum salt to the organometallic compound is suitably in the range 5:1 to 0.01:1, preferably 1:1 to 0.1:1.

The support is suitably present in amount 10 to 99.9 percent by wt. preferably 85 to 99 percent expressed as a percentage by weight of the total weight of salt, organometallic compound and support.

The catalyst can be prepared by impregnation or by allowing the components to react with the chosen support.

When the support is a refractory material it should be activated before use by heating, suitably in air at a temperature in the range 100° – 1000°C, preferably in the range 400° – 800°C.

The catalyst can be rendered more active by the presence of a small amount of an organic compound containing a hydroxyl or thiol group. The molar ratio of tungsten or molybdenum salt to the hydroxyl or thiol compound is suitably in the range 0.1:1 to 20:1, preferably 1:1 to 2:1.

If the hydroxyl or thiol compound is present in considerable excess it ceases to behave as an activator and poisons the catalyst. An excess can be used to terminate the reaction.

These compounds may also be added to the support by impregnation.

The invention also comprises a disproportionation process which process comprises contacting an olefin of formula $RR_1C = CR_2R_3$ wherein the R substitutents represent hydrogen atoms or alkyl, alkenyl, cycloalkyl, cyloalkenyl or aryl groups with the above defined heterogeneous disproportionation catalyst system under conditions of temperature and pressure which effect disproportionation of the feed.

The invention further comprises a process for the coreaction of ayclic olefins which process comprises contacting two dissimilar olefins of formulas $RR_1 C = CR_2R_3$ and $R_4R_4C = CR_6R_7$ with the defined heterogeneous disproportionation catalyst system under conditions of temperature and pressure which effect coreaction of the feed, the R substituents representing hydrogen atoms, alkyl, alkenyl, cycloalkyl, cycloalkenyl or aryl groups, with the proviso that not more than two of the groupings $RR_1C = ,R_3R_2C = ,R_4R_5C = $, or $R_6R_7 C = $ are the same.

Olefins suitable as feeds include $C_{3-30}$ alkenes, preferably $C_{3-8}$ straight chain alkenes. The alkenes may be alpha, beta or gamma etc. alkenes. Suitable alkenes include propylene, butene-1, butene-2, pentene-1, pentene-2, hexene-1, hexene-2, hexene-3, heptene-1, heptene-2, heptene-3, octene-1, octene-2, etc. Branched chain $C_4-30$ alkenes, are also suitable feeds.

The reaction temperature may be from −100° to +300° C, preferably from −20° to +50° C.

The reaction pressure may be from 10 mm of mercury to 2,000 psig, preferably a pressure which will maintain the reaction in the liquid phase e.g. 0–200 psig.

The reaction may be performed in the gaseous or liquid phases preferably in the liquid phase, and may be operated continuously or batch-wise.

If the reaction is carried out in the gas phase, an inert gas such as hydrogen or nitrogen may be employed as a diluent.

If the reaction is carried out in the gas phase, an inert gas such as hydrogen or nitrogen may be employed as a diluent.

If the reaction is carried out in the liquid phase, then an inert solvent such as an aliphatic hydrocarbon, an aromatic hydrocarbon or a halogenated hydrocarbon may be used. Suitable diluents include n-heptane, benzene and chlorobenzene.

If the reaction is carried out as a batch process suitable weight ratios of olefin to tungsten or molybdenum salt are in the range $10^6:1$ to 2:1, preferably $10^4:1$ to $10^2:1$.

In a continuous reaction in the vapor phase GHSV of the feedstock is suitably in the range 10–100,000 vol. feed/vol. catalyst/hour.

In a continuous reaction in the liquid phase the LHSV of the feedstock is suitably in the range 0.01–100 vol feed/vol catalyst/hour.

The heterogenous catalysts are less susceptible to decay than the corresponding homogeneous catalyst, and in addition, there are no problems of separation of reaction products from the catalyst. Furthermore, the catalyst effect the disproportionation of alpha olefins, which in many instances homogeneous catalyst do not. The support promotes the activity and is an essential component of the catalyst.

They are also very suitable for use in the production of non-conjugated acyclic multi olefins by the reaction of cyclic with acyclic olefins and for use in the disproportionation of halogen substituted olefins and as oligomerization and polymerization catalysts.

The heterogenous catalysts are also very suitable for use in the obligomerization of cyclic olefins as described and claimed in our British Pat. No. 1105565.

The invention is illustrated by the following examples. It should be noted that Example 1 is provided for process of comparison only and is not an example of a process according to the present invention.

EXAMPLE 1

Catalyst samples were prepared by adding 0.1 milli moles $EtAlCl_2$ in benzene to 0.025 milli moles $WCl_6$ in benzene and leaving the mixtures to stand over a period of time ranging from 10 seconds to 90 minutes. After the specified time of mixing 7.5 ml pentene-2 diluted with 10.0 ml benzene were added to each of the catalyst samples and the mixtures were left at ambient temperature for 30 minutes. The reaction was gas-liquid chromatography which shall be referred to hereinafter as terminated by the addition of 0.5 ml methanol and the products were analyzed by gas-liquid chromatography which shall be referred to hereinafter as GLC. Results are shown in Table 1.

TABLE 1

DECAY OF HOMOGENEOUS DISMUTATION CATALYST

| Feed | Pentene-2 |
|---|---|
| Catalyst | $WCl_6 \cdot EtAlCl_2$ |
| Temperature °C | 25 |
| Contact time min | 30.0 |

| Age of Catalyst (after mixing components) | % Conversion to Butene-2 and Hexene-3 |
|---|---|
| 0 | 50.0 |
| 10 sec | 11.0 |
| 15 min | 9.8 |
| 30 min | 9.1 |
| 45 min | 7.5 |
| 90 min | 7.0 |

EXAMPLE 2

Fresh heterogeneous catalyst was prepared as follows. The support ($Al_2O_3$ 5g) was activated at 580 C for 24 hours prior to impregnation with a solution of $WCl_6$ (0.26 g) in benzene. The $WCl_6 \cdot Al_2O_3$ was then allowed to dry thoroughly before being impregnated with a solution of $EtAlCl_2$ (0.18 g) in benzene. The resulting catalyst was then tested over an age range of 3 h to 13 days.

0.208 g of a 5.0 per cent $WCl_6 \cdot EtAlCl_2$ on alumina catalyst was added to 2.5 ml pentene-2 diluted with 3.0 ml benzene. The mixture was shaked thoroughly and allowed to stand for 24 h at ambient temperature. GLC analysis of the products are shown in Table 2.

TABLE 2

| Age of Catalyst (after mixing components) | % Conversion to Butene-2 and Hexene-3 |
|---|---|
| 4 hours | 47.0 |
| 1 day | 37.0 |
| 6 days | 32.5 |
| 8 days | 29.2 |
| 13 days | 25.2 |

The results clearly indicate that a heterogeneous catalyst decays much less rapidly than a homogeneous catalyst.

EXAMPLE 3

In this example the activity of the $WCl_6 \cdot Al(iBu)_3$ homogeneous catalyst is compared with that of the same catalyst supported on silica.

0.2 millimoles of $WCl_6$ (2 ml of 0.1 M $WCl_6$ in benzene) followed by 0.8 millimoles of $Al(iBu)_3$ (2 ml of 0.4 M $Al(iBu)_3$ in benzene) were added to 10 ml of pentene-2 in an atmosphere of dry $N_2$. The mixture was stirred, allowed to stand for 30 minutes then analyzed. Only traces of the disproportionation products butene-2 and hexene-3 were detected.

The heterogeneous catalyst was prepared by contacting a benzene solution of $WCl_6$ (containing 0.5 g of $WCl_6$) with 10 g of $SiO_2$ which had previously been heated under a stream of $N_2$ at 580° C for 24 h. The solution was rapidly decolorized; the supernatent liquid was poured off and the solid $WCl_6$ on $SiO_2$ was dried, and then impregnated with a solution of $Al(iBu)_3$ (containing 1 g of $Al(iBu)_3$). The final catalyst was then dried thoroughly. This catalyst (0.2 g) was added to 3.4 ml of pentene-2 and shaken for 30 minutes. The product on analysis was found to contain 4.1 per cent 2-butene 90.0 per cent 2-pentene 5.9 per cent 3-hexene.

EXAMPLE 4

5 ml of the heterogeneous catalyst was placed in a vertical reactor, and $C_3H_6$ was passed downwards through the bed at 2 liter/h (GHSV 400). The reaction temperature was 21° C and pressure atmospheric. The conversion of $C_3^-$ to $C_2^- + C_4^{-2}$ was 37.5 percent wt after 10 minutes on stream
27.0 percent wt after 30 minutes on stream
25.0 percent wt after 60 minutes on stream
20.1 percent wt after 120 minutes on stream On a fresh sample of catalyst a propylene conversion of 10.0 percent after (10 minutes on stream) was at a propylene GHSV of 4,000.

EXAMPLE 5

A second catalyst was prepared exactly as the heterogeneous catalyst in Example 3 except $Al(n-Bu)_3$ was used in place of $Al(iBu)_3$. $C_3H_6$ was passed over a 5 ml bed of this catalyst at 3 l/h (GHSV 600 21° C and atmosphere pressure); $C_3$ conversions of 41.7 percent wt after 10 minutes on stream
35.2 percent wt after 30 minutes on stream
33.1 percent wt after 60 minutes on stream
29.0 percent wt after 120 minutes on stream
28.2 percent wt after 180 minutes on stream were obtained.

On a fresh sample of the catalyst a propylene conversion of 15.6 per cent (after 10 minutes on stream) was obtained at an GHSV of 4,000.

EXAMPLE 6

A catalyst was made by a similar technique to that in Example 1, but in this case a 1 percent wt $WCl_6$ on silica support was prepared and impregnated with a benzene solution of $Sn(nBu)_4$ (8.7 g of $Sn(nBu)_4$ per g of $WCl_6$). Samples (1 g) of this catalyst were added to (a) 1.3 ml of pentene-2 and (b) 5.2 ml of pentene-2 both were diluted with an equal volume of benzene. After shaking for 30 minutes, the products were analyzed. The analyses showed that 50 per cent and 13.4 per cent conversions of pentene-2 (to butene-2 and hexene-3) respectively had been obtained.

These examples show that the heterogeneous catalyst can be active under conditions were the corresponding homogeneous catalyst is inactive, also that whereas homogeneous catalysts do not effect the disproportionation of α-olefins and heterogeneous catalyst readily bring about such reactions.

What we claim is:

1. A heterogeneous disproportionation catalyst consisting essentially of (a) a salt of molybdenum or tungsten selected from the group consisting of molybdenum pentachloride and tungsten hexachloride. (b) tetrabutyl tin and (c) a solid support selected from the group consisting of alumina, silica, magnesia, sepiolite, boria, thoria, charcoal, pumice and molecular sieve and wherein the molar ratio of the tungsten or molybdenum salt to teterabutyl tin is in the range of from about 5:1 to 0.01:1 and the support is present in an amount of from about 10 to 99.9 percent by weight expressed as a percentage by weight of the total weight of salt, tetrabutyl tin and support.

2. A catalyst as claimed in claim 1 wherein the molar ratio of the tungsten or molybdenum salt to tetrabutyl tin is in the range of from about 1:1 to 0.1:1.

3. A catalyst as claimed in claim 1 wherein the support is present in an amount of from about 85 to 99 percent expressed as a percentage by weight of the total weight of salt, tetrabutyl tin and support.

4. A catalyst as claimed in claim 1 wherein the catalyst is activated by the addition of methanol and wherein the molar ratio of tungsten or molybdenum salt to the methanol is in the range of from about 0.1:1 to 20:1.

5. A catalyst as claimed in claim 4 wherein the molar ratio is in the range of from about 1:1 to 2:1.

* * * * *